(12) United States Patent
Galtier et al.

(10) Patent No.: US 6,684,851 B1
(45) Date of Patent: Feb. 3, 2004

(54) METHOD FOR DETERMINING A FUNCTIONING PARAMETER OF AN ENGINE

(75) Inventors: Frederic Galtier, Montpellier (FR); Willibald Schuerz, Aufhausen (DE)

(73) Assignees: Siemens Automotives SA, Toulouse Cedex (FR); Siemens AG, Munich (DE)

( * ) Notice: Subject to any disclaimer, the term of this patent is extended or adjusted under 35 U.S.C. 154(b) by 0 days.

(21) Appl. No.: 09/936,233

(22) PCT Filed: Mar. 10, 2000

(86) PCT No.: PCT/EP00/02146

§ 371 (c)(1),
(2), (4) Date: Dec. 7, 2001

(87) PCT Pub. No.: WO00/55499

PCT Pub. Date: Sep. 21, 2000

(30) Foreign Application Priority Data

Mar. 12, 1999 (FR) .............................................. 99 03086

(51) Int. Cl.$^7$ .................................................. F02P 5/00
(52) U.S. Cl. ............. 123/406.44; 701/115; 123/406.26; 123/406.32
(58) Field of Search ....................... 123/406.23, 406.24, 123/406.26, 406.32, 406.35, 406.44; 701/115

(56) References Cited

U.S. PATENT DOCUMENTS 5,553,594 A * 9/1996 Ehlers et al. ............... 123/609

FOREIGN PATENT DOCUMENTS

| EP | 0 302 735 | 2/1989 |
| EP | 0 892 161 | 1/1999 |
| JP | 60-162060 | 12/1985 |

* cited by examiner

Primary Examiner—Henry C. Yuen
Assistant Examiner—Hai Huynh
(74) Attorney, Agent, or Firm—Young & Thompson

(57) ABSTRACT

A process for determining an operating parameter of an internal combustion engine as a function of three control parameters (N, P, $\lambda$) of this motor, comprises:
   a) establishing a first map of the operating parameter as a function of two control parameters, the third control parameter being fixed at a first value;
   b) establishing a second map of the operating parameter as a function of the two same control parameters, the third control parameter being fixed at a second value;
   c) establishing a relationship between the operating parameter and the third control parameter over all the range of variation of this parameter at at least one specific operating point; and
   d) using this relationship to determine the operating parameter as a function of the three control parameters at all points of operation of the motor.

5 Claims, 1 Drawing Sheet

METHOD FOR DETERMINING A FUNCTIONING PARAMETER OF AN ENGINE

Figure 1:
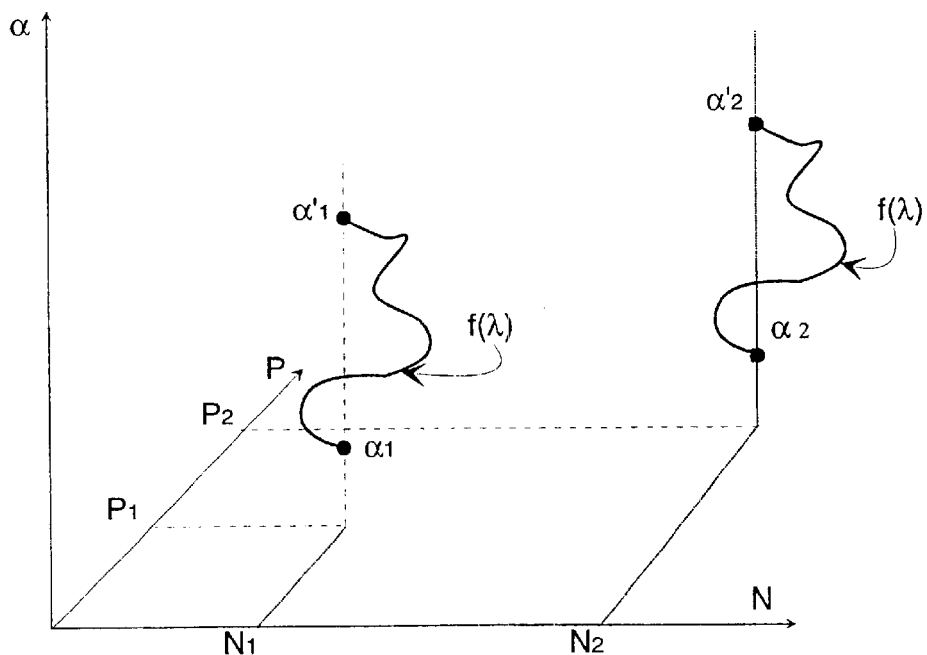

Process for determining an operating parameter of an internal combustion engine as a function of three control parameters of this motor. More particularly, such a procedure permits determining the angle of the ignition advance ($\alpha$) as a function of the speed of rotation of the engine (N), of the motor load (intake pressure P) and of the air/fuel ratio ($\lambda$ lambda).

In indirectly injected internal combustion engines, it is known to determine the angle $\alpha$ of ignition advance as a function of the speed of rotation of the engine N and of the quantity of air P admitted. Thus, so that this type of engine can operate correctly, it is necessary that the richness of the mixture R be substantially constant and equal to 1. Because of this, the parameter $\lambda$ (lambda), which is the inverse of this richness 1/R, does not vary or varies only little, and it is not or almost not necessary to take account of it to determine the angle of ignition advance $\alpha$. Thus, this angle of ignition advance $\alpha$ is determined on a test bed for an engine type and its value is then applied to all the engines of the same type with the help of maps connecting the angle of ignition advance $\alpha$, the engine speed N and the quantity of air introduced into the cylinder P.

Such maps are now made and although they require a large number of operating points (N, P) their construction and use do not give rise to great difficulty.

It is known from EP 302 735 to compute two correction maps (so-called high degree and low degree maps) so as to determine the instant of ignition in each cylinder of the motor. The air/fuel ratio is modified in accordance with at least one of the maps. These maps thus permit switching between two different octane indices. But they do not permit specifying a correction factor which would be a function of this octane index. Thus, in the scope of this document, only two octane indices are necessary.

It is also known from EP 892 161 to use two separate maps to determine the instant of ignition. The first corresponds to operation of the engine according to a homogeneous combustion mode and the second corresponds to operation with a rich mixture (which is to say during switching between the stratiphied mode and the homogeneous mode). The passage from one map to the other takes place by linear interpolation of a parameter representative of the engine operation. Unfortunately, when the engine operating parameter does not vary in a linear manner, it is thus impossible to use these two maps, because otherwise the values computed for this parameter will differ too much from real values.

In the case of internal combustion engines using direct fuel injection in each of the cylinders and/or in those using a lean mixture, such maps become useless. Thus, such engines have a large range of variations of $\lambda$. Because of this, the angle of ignition advance no longer depends solely on the motor speed (N) and its load (P), but it also depends and largely on $\lambda$. However, memorization of tables in a four-dimensional space ($\alpha$, N, P, $\lambda$) is very difficult to carry out in a simple manner. Standard microprocessors used on central control units of the operation of the engine do not permit memorizing and processing such four-dimensional maps. These maps thus require large memory resources, their management requires too much computation and depends on a particular symbolism for their representation which is not available in conventional microprocessors.

The object of the present invention is thus to represent in a fashion which will be the simplest possible, the most precise and the least costly in computation time, a four-dimensional space. In this space, three of the axes define control parameters of the motor (for example N, P, $\lambda$) and permit determining a fourth variable (for example $\lambda$) which is a parameter of operation of this motor.

It is already known, to this end, to determine an additive or proportional correction factor as a function of $\lambda$, established from a single table connecting the advance correction a and the parameter $\lambda$ at an operating point (N, P). However, this type of correction does not permit covering wide ranges of variation of $\lambda$, particularly it is not possible with such a correction to define a correction factor valid for all the points (N, P) of operation. Because of this, the ignition advance angle becomes imprecise if $\lambda$ is far from the basic lambda and/or if it is a matter of an operation point (N, P) very different from that for which the correction factor has been defined.

It is also known to establish two maps giving the ignition advance angle $\alpha$ as a function of the motor speed N and of the motor load P, a first map corresponding to a minimum $\lambda$ and a second map corresponding to a maximum $\lambda$. As a function of the real value of $\lambda$, one shifts from one to the other of these maps. However, such an operating mode has no finesse as to computation of the ignition advance angle, it is not possible to take account of the present real value of $\lambda$.

The object of the present invention is to determine the ignition advance angle $\alpha$ accurately as a function of N, P and $\lambda$. More precisely, the present invention seeks to establish in a manner that is simple and less costly as to computation time and memory, a four-dimensional table.

To this end, the present invention relates to a process for determining an operating parameter ($\lambda$) of an internal combustion engine as a function of three control parameters (N, P, $\lambda$) of this engine, characterized in that it consists in:
- establishing a first map of the operating parameter ($\alpha$) as a function of two of the control parameters (N, P), the third control parameter ($\lambda$) being fixed at a first value,
- establishing a second map of the operating parameter ($\lambda$) as a function of the two same control parameters (N, P), the third control parameter ($\lambda$) being fixed at a second value,
- establishing a relationship between the operating parameter ($\alpha$) and the third control parameter ($\lambda$) over all the range of variation of this parameter at at least one specific point of operation (N, P),
    - using this relationship to determine the operating parameter ($\alpha$) as a function of the three control parameters (N, P, $\lambda$) for all points of operation of the motor.

It is to be noted that the process according to the invention can be applied to the determination of other parameters than those given by way of example, particularly his process also permits computing the Exhaust Gas Recirculation (EGR) level for exhaust gases, in which four parameters are to be followed, but also the advance correction as a function of the EGR level or of the VVT (Variable Valve Timing: modification of the intake diagram) factor and of any other operational parameter depending on more than two control parameters.

Figure 2:
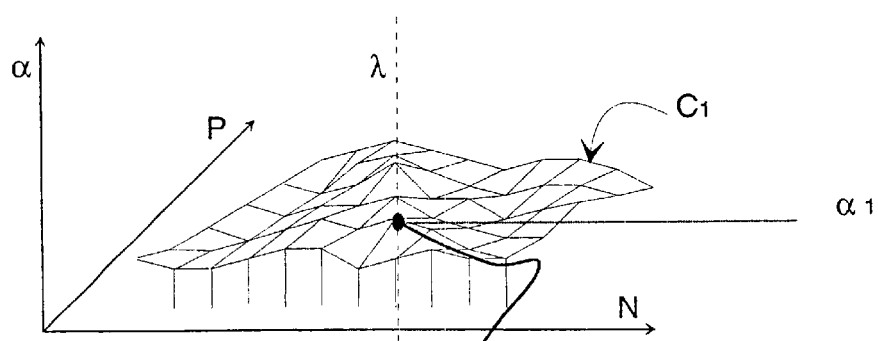
Figure 2:
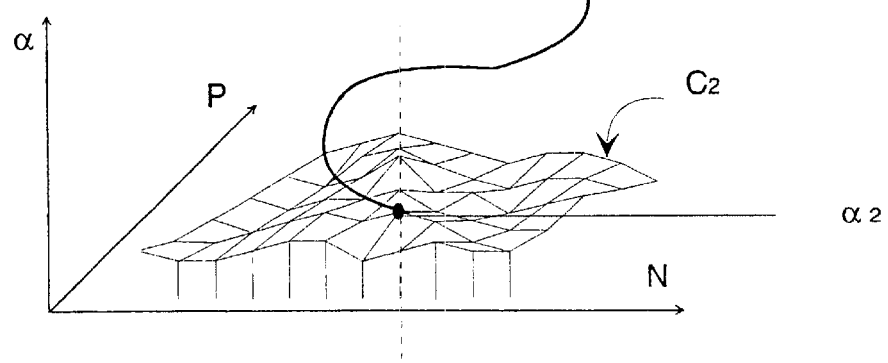

Other objects, characteristics and advantages of the present invention will become apparent from the description which follows, by way of non-limiting example and with reference to the accompanying drawings, in which:

FIG. 1 is a simplified view showing schematically the four parameters to be memorized, and, FIG. 2 is a schematic view showing the process according to the invention.

The invention consists in memorizing in the simplest way possible a space with four dimensions. By way of example, this memorization is applied to computing the ignition advance angle a for an internal combustion engine.

This ignition advance angle α (FIG. 1) depends in known manner on the speed of rotation of the motor N (representative f the motor speed), on the intake pressure P (representing he quantity of air introduced into the cylinder, which is to say the load of the motor) and on the air/fuel ratio called λ (representative of the composition of the mixture).

It is already known to make maps connecting the motor speed and, the motor load P and the angle of ignition advance α. Such maps give, for a given speed/load (N, P) couple, the advance angle α to be used.

The process of memorizing a four-dimensional space (FIG. 2) according to the invention consists in:

making a first map C1 connecting P, N and α, whilst λ is fixed at a first value (for example a lean mixture), then in making a second map C2 connecting P, N and α whilst λ is fixed at a second value (for example a rich mixture).

There are thus obtained two maps C1 and C2, each established for a specific λ.

According to the invention, starting at at least one given operational point (P1, N1) (FIG. 1) for one type of motor placed on a test bench, the ignition advance angle α is determined for each value of λ. There is thus established a relationship f (λ) between the operating parameter (α) and the third control parameter (λ) over all the range of variation of this parameter at at least one specific operating point (N1, P1).

For greater precision in the determination of the relationship connecting the ignition advance angle α and λ, it is possible to establish this curve at several separate operating points, for example at the point (P2, N2) (FIG. 1).

The relationship connecting α and λ is a non-linear relation, by way of example it has been represented in the form of a thick line in FIGS. 1 and 2. Of course, the graphical representation of this function is not limited to the illustrated form.

According to the invention, at any operating point (P, N), the determination of the operating parameter (ignition advance angle α) as a function of the three control parameters N, P and λ is carried out according to the following formula:

$$\alpha = \alpha 1 + [\alpha 2 - \alpha 1] \times f(\lambda)$$

in which:

α1 is the value of the operating parameter (ignition advance angle) given by the first map C1 for a couple of control parameters (N, P), α2 is the value of the operating parameter (ignition advance angle) given by the second map C2 for this same couple of control parameters (N, P), and f(λ) is the non-linear relationship connecting the operating parameter (ignition advance angle α) and the third control parameter λ.

Thus, the process according to the present invention has the advantage of requiring only two maps (N, P, α). As soon as the relationship α=f(λ) is determined at at least one operating point, it is applicable to all points and permits easily connecting the three control parameters to the operating parameter α. This relationship α=f(λ) can also be shown by a simple single dimensional map.

Thus, according to the invention, the interpolation factor between the two maps is a non-linear function determined on the test bench. This function can be mapped.

Thus, the representation of a four-dimensional space can be carried out in a rapid manner with little computation, by replacing a table defining an operating parameter α as a function of three control parameters (N, P, λ) which is known not to be manageable, by two tables as a function of control parameters (N, P) plus a non-linear interpolation or extrapolation between these two tables as a function of a non-dimensional representation f(λ) of the third control parameter λ.

The interpolation/extrapolation between these two tables (maps) is not done linearly, because that would not give access to the third degree of freedom. This interpolation/extrapolation is carried out according to a particular law defined as a function of the third parameter λ. The invention thus permits recovering all the degrees of freedom necessary for the complete use of this four-dimensional space.

It will be noted that, to determine the non-linear relationship, one can either base on a given and favorable operational point and then interpolate/extrapolate this relationship to all the points, or determine the optimum law from several separate operating points.

It will be noted (if one knows the values of λ at several operating points (N,P) that are predefined and mapped) that it is also possible to bracket the real value of N and P by similar values of each of the maps to give by extrapolation/interpolation an extrapolated value (λ), then to obtain, by means of the non-linear relationship, the corresponding value of (α).

This modification permits, as in the case of the first embodiment, using all the range of variations of λ. The results obtained are more precise and more reliable than a simple correction factor. This modification is stronger given the laws of variations of the operating parameter as a function of the control parameters.

It will be noted that this modification permits representing perfectly the two types of known corrections of which mention has been made, namely the simple additive or proportional correction quite like the simple and binary shift from one table to the other. It suffices for that to select judiciously the law α=f(λ).

It will be noted that if these two maps C1 and C2 already exist, they can be referred to without having to redo the entire calibration. It suffices to define the relationship permitting passing from one to the other.

If the range of variation of λ changes in the course of development of the project for perfecting an engine type, it suffices to change the range of variation of λ without having to start over on all the calibration already made.

Of course, the present invention is not limited to the embodiment described above and covers all modifications within the scope of those skilled in the art. Particularly, the process according to the invention can be applied anywhere that a memorization of a four-dimensional space is necessary. Thus, the process according to the invention can be applied to the computation of the Exhaust Gas Recirculation (EGR) and particularly to the correction of ignition advance to be used as a function of this level or as a function of the VVT, etc . . .

Similarly, the maps C1 and C2 are not necessarily made by fixing λ at the minimum or the maximum (rich mixture or lean mixture). These two maps can be made for any two separate values of α.

What is claimed is:

1. Process for the determination of an operating parameter (α) of an internal combustion engine as a function of three control parameters (N, P, λ) of this engine, said process consisting in:

establishing a first map (C1) of the operating parameter (α) as a function of two of the control parameters (N, P), the third control parameter (λ) being fixed at a first value, and establishing a second map (C2) of the operating parameter (α) as a function of the same two control parameters (N, P), the third control parameter (λ) being fixed at a second value, said process being characterized in that it consists moreover in:

establishing at the test bench a non-linear relationship f(λ) between the operating parameter (α) and the third control parameter (λ) over all the range of variation of this parameter at at least one specific operating point (N, P), and using this relationship to determine the operating parameter (α) as a function of the three control parameters (N, P, λ) at all operating points of the engine.

2. Process according to claim 1, characterized in that the operating parameter (α) is determined according to the following relationship:

$$\alpha = \alpha 1 + [\alpha 2 - \alpha 1] \times f(\lambda)$$

in which:

α1 is the value of the operating parameter given by the first map (C1) for a couple of control parameters (N, P), α2 is the value of the operating parameter given by the second map (C2) for this same couple of control parameters (N, P), and f(λ) is the non-linear relationship connecting the operating parameter α and the third control parameter λ.

3. Process according to claim 2, characterized in that the determination of the non-linear function connecting the operating parameter (α) and the third control parameter (λ) is carried out at at least two separate operation points for which the two control parameters (N, P) are fixed.

4. Process according to claim 1, characterized in that the real value of N and P is bracketed by similar values of each of the maps (C1, C2) to give by extrapolation/interpolation an extrapolated value of (λ) permitting obtaining, by means of the non-linear relationship, the corresponding value of (α).

5. Process according to claim 1, characterized in that the operating parameter is the ignition advance angle (α), and the three control parameters are:

a parameter representing motor speed (N), a parameter representing the motor load (P) and, a parameter representing the composition of the mixture (λ), the first and second maps (C1, C2) giving the ignition advance angle (α) as a function of the speed (N) and of the load (P).

* * * * *